United States Patent [19]

Ponzoni et al.

[11] 3,888,859
[45] June 10, 1975

[54] METHOD FOR A FREEZE DRIED FORTIFIED COFFEE HAVING IMPROVED RATE OF SOLUBILITY

[75] Inventors: George B. Ponzoni, Spring Valley, N.Y.; Richard J. Leonard, Totowa, N.J.

[73] Assignee: General Foods Corporation, White Plains, N.Y.

[22] Filed: Oct. 2, 1972

[21] Appl. No.: 294,063

[52] U.S. Cl. ............................ 426/262; 34/5; 62/58; 426/366; 426/385
[51] Int. Cl. ............................ A23l 3/36; A23f 1/06
[58] Field of Search .............. 99/65, 71, 199; 62/58; 34/5; 426/262–270, 384–385, 443, 444, 492, 366

[56] References Cited
UNITED STATES PATENTS

| | | | |
|---|---|---|---|
| 2,206,319 | 7/1940 | Geitz, Jr. | 99/65 X |
| 2,324,526 | 7/1943 | Morgenthaler | 99/71 |
| 2,333,027 | 10/1943 | Morgenthaler | 99/71 |
| 2,340,989 | 2/1944 | Salkin | 99/71 |
| 2,826,504 | 3/1958 | Chase et al. | 99/71 |
| 3,253,420 | 5/1966 | De George | 99/71 X |
| 3,408,919 | 11/1968 | Geggenheim | 99/71 |
| 3,438,784 | 4/1969 | Clinton et al. | 99/71 |
| 3,457,083 | 7/1969 | Kawai et al. | 99/71 X |

OTHER PUBLICATIONS

Rate-controlling factors in freeze drying. In Fundamental aspects of the Dehydration of Foodstuffs. Macmillan Co., N.Y., a compilation of papers read at the conference held in Aberdeen 25th–27th, March 1958.

Effect of Freezing Rate on Rate of Sublimation and Flavor Retention in Freeze Drying. In Symp. Thermodynamic Aspects of Freeze Drying. Intern. Inst. Refrig., Comm. X, Lausanne, Switzerland.

"Food Dehydration," Vol. 1, Second Edition, published by AVI Pub. Co. 1973, Drying Methods and Phenomena, pp. 161–167.

"Coffee Processing Technology," by Sivetz and Foote, Vol. 1, Published by AVI Pub. Co. Found in Gp 170, pp. 134–137.

*Primary Examiner*—Frank W. Lutter
*Assistant Examiner*—N. Greenblum
*Attorney, Agent, or Firm*—Thomas R. Savoie; Bruno P. Struzzi

[57] ABSTRACT

Liquid coffee extract is brought up to the relatively high solid content of between about 35 and 50% solids by the addition of various nutritive ingredients and then slowly and continuously cooled from about 35° to 40°F to between −14°F and −20°F over a period of at least 40 minutes. The extract is then thoroughly frozen and freeze dried to a stable moisture content to yield a dry, soluble coffee product having an improved and acceptable rate of solubility.

4 Claims, No Drawings